Figure 1:
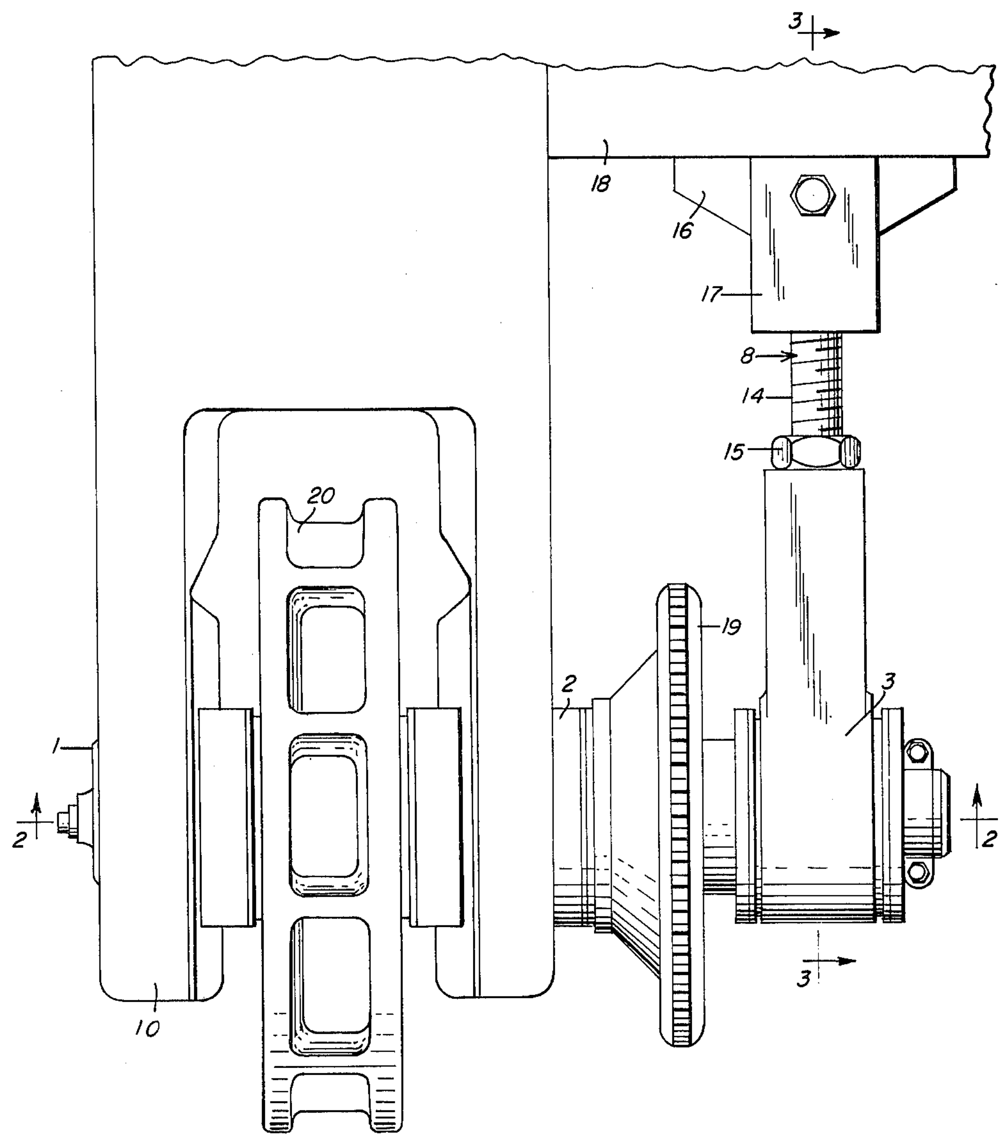

TRACK DRIVE SHAFT MOUNTING UNIT OF A CRAWLER ASSEMBLY

Filed Oct. 28, 1963 3 Sheets-Sheet 1

TRACK DRIVE SHAFT MOUNTING UNIT OF A CRAWLER ASSEMBLY

TRACK DRIVE SHAFT MOUNTING UNIT OF A CRAWLER ASSEMBLY

Filed Oct. 28, 1963

United States Patent Office 3,241,889
Patented Mar. 22, 1966

3,241,889

TRACK DRIVE SHAFT MOUNTING UNIT OF A CRAWLER ASSEMBLY

Sergey Mikhailovich Borisov and Arvid Karlovich Reish, Moscow, and Alexander Anatolievich Boolanov, Reutovo, U.S.S.R., assignors to Vsesojuzny Nauchno-Issledovatelsky Institute Stroitelnogo i Dorozhnogo Mashinostrojenia, Moscow, U.S.S.R.

Filed Oct. 28, 1963, Ser. No. 319,184
3 Claims. (Cl. 305—32)

This invention relates to drive mechanisms for track laying vehicles especially universal single-bucket crawler excavators and more particularly, to mounting units for the drive shaft of the track of the excavator vehicles.

It is well-established that in excavator designs in which the tracks are driven from the travelling gear horizontal shaft by chains trained about the track driving sprockets, each drive shaft is mounted in two journal boxes provided with supporting sliding bearings. The mounting unit for the shaft is installed on the end of the crawler beam and in addition to the two journal boxes provided with bearings, includes two devices for adjusting the position of the drive shaft. These adjusting devices which, for example, may be of a screw type, change the position of the drive shaft having the sprocket mounted thereon, thereby adjusting the tension of the chain which transmits power from the travelling gear horizontal shaft to the sprocket.

When the track drive shaft is assembled in the mounting unit, the track drive sprocket which is key-mounted and pressed on the middle section of the drive shaft is located between the two journal boxes while the chain-driven sprocket is located on the outer side of the inner journal box of the mounting unit, on the cantilever end of the drive shaft. The journal boxes with pressed in bearings are provided with guiding slots and rest on the flat supporting surfaces of the crawler beams with the guiding slots of the journal boxes coacting with the guides of the crawler beams.

However, during operation of the existing mounting units for the drive shaft, the load transmitted from the drive shaft to the journal boxes is of an extremely non-uniform nature. This may be explained by the location of the chain-driven sprocket on the cantilever end of the drive shaft which results in the transmission of the larger portion of the load from the drive shaft to the journal box located between the drive sprocket and the chain driven sprocket. As a result, after a certain operational period, the position of the drive shaft changes and the shaft becomes misaligned with respect to the longitudinal axes of the journal box bearings. Such misalignment is conveyed further from the shaft to the drive sprocket and the chain-driven sprocket mounted on the said shaft and this, in turn, causes improper meshing between the chain-driven sprocket and the chain and between the drive sprocket and the track links. This causes excessive and non-uniform wear of the drive sprockets, chain-driven sprocket, journal box bearings, track links, and the drive shaft.

A number of prior attempts to overcome the aforementioned difficulties of operation and the short-comings of the design have resulted in no practical results.

An important object of the present invention is to overcome the foregoing and other problems existing in the art and the problems have been solved in that the mounting unit for the drive shaft provides for considerable equalization of the loads transmitted from the drive shaft to the journal boxes and prevents misalignment of the drive shaft thus extending the service life of the drive mechanism for the track.

Broadly, the object of the invention resides in the uniform transmission of the load from the drive shaft to the journal boxes and the present mounting unit incorporates three journal boxes, each of which is provided with supporting sliding bearings, the outer fixed journal box serving to take any radial loads (external loads acting on a plane perpendicular to the geometric axis of the shaft), an adjusting device being cooperable with such outer journal box for displacing the same in the crawler beam guides for adjusting the position of the drive shaft, the second or middle journal box being movable horizontally and self-positionable in the crawler beam guides for taking and transmitting to such beam only those loads directed square to its longitudinal axis, and the third journal box being located at the end of a drive shaft adjusting device and rotatable together with the latter about an axis passing through the supporting pivot of the adjusting device in a plane parallel to the longitudinal axis of the crawler beam for taking loads directed only along the longitudinal axis of the adjusting device.

Figure 2:
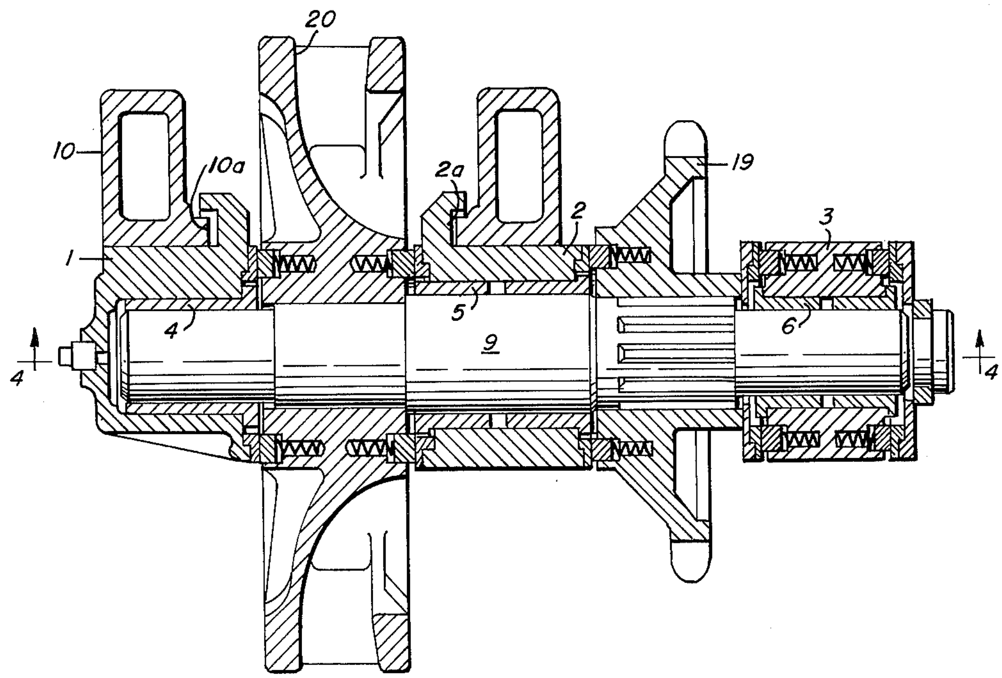
Figure 3:
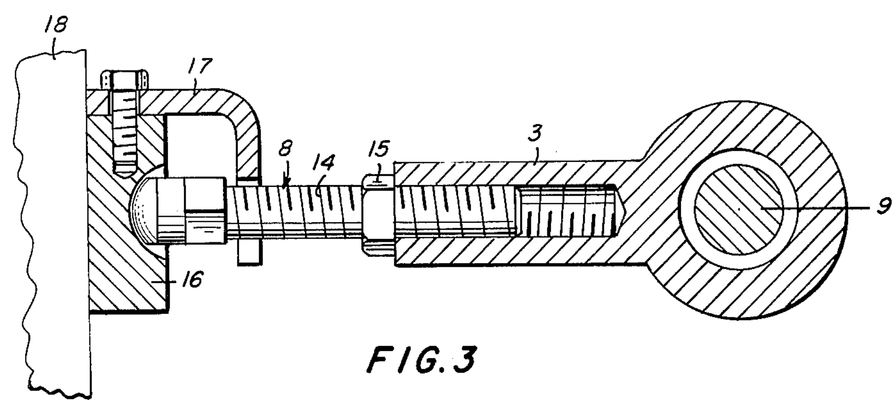
Figure 4:
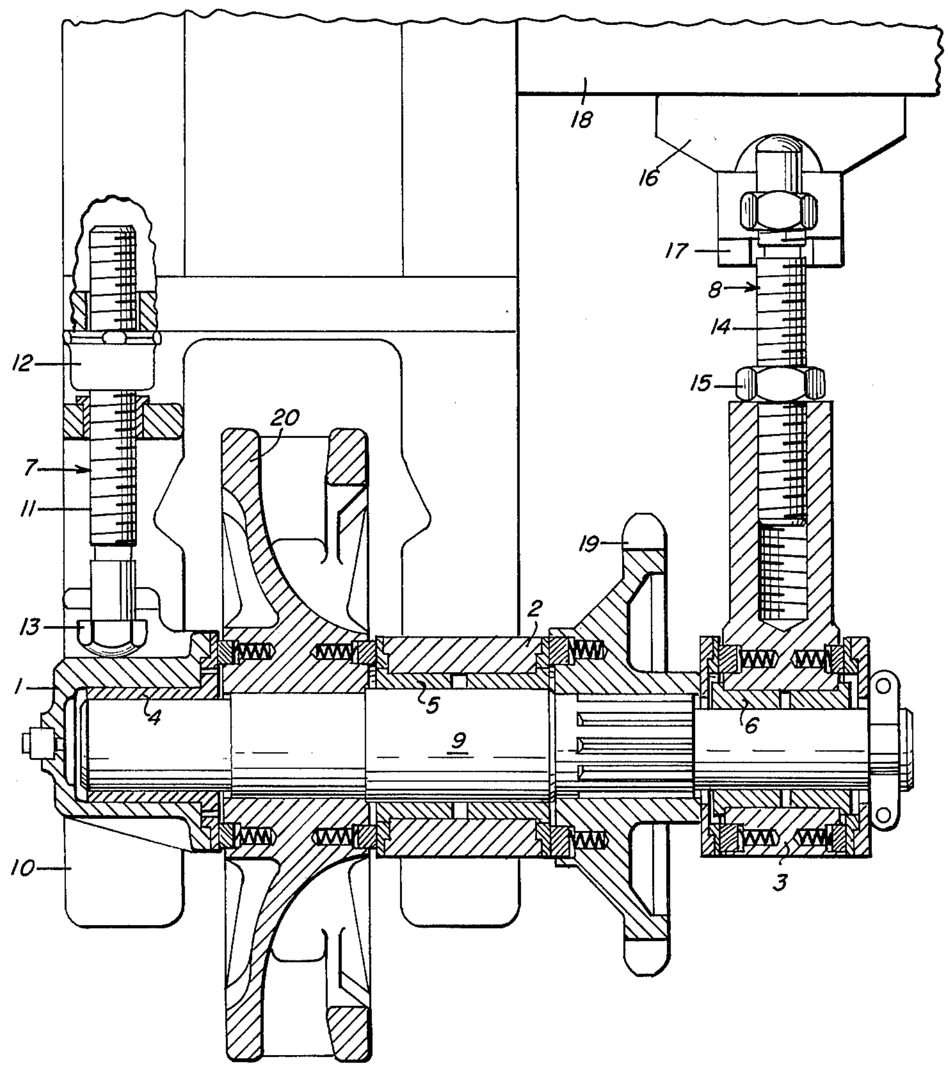

Additional objects and advantages of the invention will become more readily apparent to those skilled in the art from the following detailed description and annexed drawings in which:

FIGURE 1 is a horizontal plan view of the drive mechanism for a universal single-bucket crawler-type excavator according to the invention, FIGURE 2 is a sectional view taken along the line 2—2 of FIGURE 1, FIGURE 3 is a sectional view taken along the line 3—3 of FIGURE 1, and FIGURE 4 is a bottom view partly in cross section and partly broken away, of the invention.

The present mounting unit for the track drive shaft includes three journal boxes 1, 2 and 3 provided with supporting sliding bearings 4, 5 and 6, respectively, and two adjusting devices 7 and 8 (FIG. 4) for adjusting the position of a drive shaft 9 with the devices being used to adjust the tensioning of the drive chain. The fixed or outer end journal box 1 with the bearing 4 takes any radial loads in operation, that is, external loads acting on a plane perpendicular to the geometric axis of the shaft 9. Movement of the journal box 1 in the guides of a crawler beam 10 is effected by the adjusting device 7 for adjusting the position of the drive shaft 9. As best shown in FIG. 4, the adjusting device 7 is preferably defined by a screw member 11 provided with a tensioning nut 12 and headed portion 13 thereof coacts with the box and thus receives the load from such box and transmits the same to the beam 10.

The guides of the journal box 1 are shown at 1*a* and those of the middle or intermediate journal box 2 at 2*a* cooperate freely with the guides of the beam 10 shown at 10*a* in FIG. 2 and move along the beam guides if the position of the drive shaft 9 is changed. Due to this self-adjusting, the journal box 2 can move freely along the guides parallel to the longitudinal axis of the beam for taking and transmitting to beam 10 only those loads which are directed perpendicularly to the longitudinal axis of the beam 10.

The journal box 3 is mounted on the end of an adjusting device 8. The adjusting device 8 (FIGS. 3 and 4) includes a screw member 14 provided with a tensioning nut 15 with the end of the screw member resting on a spherical seat 16 and being held therein by a shackle 17. The seat 16 is mounted laterally of the beam 10 on a cross-member 18 of the bogie frame. In other words, the adjusting device 8 is mounted in spaced parallel relationship to the beam. The journal box 3 is adapted to take and transmit to the cross member 18 only those loads which are directed along the longitudinal axis of the screw member 14. Any other loads directed at any other angle to the longitudinal axis of the screw 14 will cause the adjusting device 8 to turn in the seat 16. Actually, the journal box 3 takes mainly the loads caused by the tension of the chain which drives a sprocket 19.

A track drive sprocket 20 driven by the shaft 9 through the sprocket 19 which is splined to the shaft is mounted between the journal boxes 1 and 2, whereas the sprocket 19 is mounted between journal boxes 2 and 3. The loads of the sprockets 19 and 20 in operation are transmitted with a sufficient degree of uniformity to all three journal boxes through the shaft 9. In this case, the stationary journal box 1 takes any radial loads, the self-adjusting journal box 2 takes only those loads which are directed perpendicularly to the longitudinal axis of the beam 10, and journal box 3 only the loads directed parallel to the axis of the adjusting device 8. The mounting of the drive sprocket 20 and the sprocket 19 between the journal boxes precludes misalignment of the shaft 9, thereby improving the operating conditions of the drive mechanism and prolonging its service life.

By virtue of the mounting unit disclosed herein distortion of the drive shaft during operation is prevented and servicing of such unit for adjustments and repairs is facilitated by providing easy access to the shaft adjusting devices since one of such devices is installed in spaced parallel relationship to the crawler beam.

The invention is not to be confined to any strict conformity to the showings in the drawings but changes or modifications may be made therein so long as such changes or modifications mark no material departure from the spirit and scope of the appended claims.

What we claim is:

1. In a vehicle of the type having an endless track, a beam extending longitudinally of the vehicle, a drive shaft for the endless track arranged perpendicularly to said beam and a mounting unit for the drive shaft, said mounting unit including three journal boxes, supporting sliding bearings in each journal box, the first of the journal boxes being mounted on one end of said drive shaft, guides on said beam, adjusting means cooperable with said guides and said first journal box for adjusting the position of the drive shaft with said first journal box taking loads acting on a plane perpendicular to the geometric axis of the drive shaft and transmitting the same via adjusting means to said beam, the second journal box being spaced axially from said first journal box, complemental guide means on said second journal box and said beam respectively allowing free movement of the second journal box in both directions parallel to the longitudinal axis of the beam upon adjustment of the position of the drive shaft with said second journal box taking and transmitting to said beam only loads perpendicular to the longitudinal axis of said beam, the third journal box being spaced axially from the second journal box, a cross member arranged in spaced parallel relationship to said drive shaft, second adjusting means including an end portion engageable with said cross member and a second end portion supported on the other end of said drive shaft, and said third journal box being mounted on the second end portion of said second adjusting means and rotating about the axis passing through the last named end portion of said second adjusting means with said third journal box taking only those loads which are parallel to the longitudinal axis of said second adujsting means and transmitting the same via the first named end portion of said second adjustment means to said cross member.

2. The vehicle as claimed in claim 1 including a driven sprocket secured to said drive shaft in the space between the second and third journal boxes, and a drive sprocket for the endless track attached to said drive shaft in the space between said first and second journal boxes.

3. In a vehicle of the type having an endless track, a beam extending longitudinally of the vehicle, a drive shaft for the track arranged perpendicularly to said beam and a mounting unit for the drive shaft, said mounting unit including three journal boxes, supporting sliding bearing means in each journal box, the first of the journal boxes being mounted on one end of said drive shaft, guides on said beam, adjusting means cooperable with said guides and said first journal box for adjusting the position of the drive shaft with said first journal box taking loads acting on a plane perpendicular to the geometric axis of the drive shaft and transmitting the same via said adjusting means to said beam, said adjusting means including screw member, a tensioning nut therefor and a headed portion engaging said first journal box, the second journal box being spaced axially from said first journal box, complemental guide means for said second journal box and said beam whereby said second journal box is movable freely parallel to the longitudinal axis of the beam upon adjustment of the position of the drive shaft with said second journal box taking and transmitting to said beam only loads perpendicular to the longitudinal axis of said beam, the third journal box being spaced axially from the second journal box, a cross member arranged in spaced parallel relationship to said drive shaft, second adjusting means cooperable with said cross member and supported on the other end of said drive shaft, said third journal box being mounted on said second adjusting means and rotating about the axis passing through the support of said second adjusting means with said third journal box taking only those loads which are parallel to the longitudinal axis of said second adjusting means and transmitting the same via said second adjustment means to said cross member, said second adjusting means including a screw member having a free end, a tensioning nut therefor, a spherical seat on said cross member, and means for retaining the free end of said screw member on said seat so that loads directed at any angle other than along the longitudinal axis of said screw member will cause said second adjusting means to turn in said spherical seat, a driven sprocket secured to said drive shaft in the space between the second and third journal boxes, and a drive sprocket for the endless track attached to said drive shaft in the space between said first and second journal boxes.

References Cited by the Examiner

UNITED STATES PATENTS

| | | | |
|---|---|---|---|
| 1,153,570 | 9/1915 | Price | 305—32 X |
| 1,656,899 | 1/1928 | Best | 74—242.14 |
| 1,792,759 | 2/1931 | Polakoff | 305—32 |

A. HARRY LEVY, *Primary Examiner.*

ARTHUR L. LA POINT, BENJAMIN HERSH, *Examiners.*